United States Patent [19]

Kaiser

[11] 4,423,427
[45] Dec. 27, 1983

[54] SUBSTRATE FOR OPTICAL RECORDING MEDIA AND INFORMATION RECORDS

[75] Inventor: Charlie J. Kaiser, Trenton, N.J.

[73] Assignee: RCA Corporation, New York, N.Y.

[21] Appl. No.: 371,739

[22] Filed: Apr. 26, 1982

[51] Int. Cl.³ .......................................... G01D 15/34
[52] U.S. Cl. ..................... 346/135.1; 346/76 L; 428/65; 428/409; 428/413; 428/446; 430/945; 369/286
[58] Field of Search .................... 346/135.1, 76 L; 369/275, 283, 284, 286, 288; 427/240, 407.1; 428/409, 425, 64, 65, 443, 446, 451, 522; 430/945

[56] References Cited

U.S. PATENT DOCUMENTS

| | | | |
|---|---|---|---|
| 3,665,483 | 5/1972 | Becker et al. | 346/1 |
| 3,911,444 | 10/1975 | Lou et al. | 346/1 |
| 4,069,487 | 1/1978 | Kasai et al. | 346/76 L |
| 4,097,895 | 6/1978 | Spong | 358/128 |
| 4,109,045 | 8/1978 | Goshima | 428/212 |
| 4,175,145 | 11/1979 | Fechter | 427/240 |
| 4,216,501 | 8/1980 | Bell | 358/128.5 |
| 4,300,143 | 11/1981 | Bell et al. | 346/135.1 |
| 4,387,381 | 6/1983 | Bell | 346/135.1 |

OTHER PUBLICATIONS

Bartolini, R. A. et al., Optical Disk Systems Emerge, IEEE Spectrum 8/78, pp. 20-28.
U.S. Patent application No. 837,420, Spong et al., now abandoned, 9/77.

Primary Examiner—Joseph W. Hartary
Attorney, Agent, or Firm—Birgit E. Morris

[57] ABSTRACT

A major surface of a disc-shaped plastic base is coated with two or more nonconformal coating layers with a solvent barrier layer interposed between said coating layers. The nonconformal coating layers fill in surface imperfections of the base while the solvent barrier layers allow an efficient stacking of said coating layers to yield a surface suitable for optical recording.

10 Claims, 3 Drawing Figures

SUBSTRATE FOR OPTICAL RECORDING MEDIA AND INFORMATION RECORDS

BACKGROUND OF THE INVENTION

The present invention relates to an improved substrate and to an optical recording medium and an information record overlying such an improved substrate.

Information may be recorded by exposing a region of an optical recording medium to a recording light beam thereby changing the local optical properties of the exposed region. The simplest such recording medium is a monolayer structure having a light absorptive layer overlying a substrate. Recording of information is accomplished by locally melting or ablating, or altering the crystallinity of the absorptive layer to change the reflectivity of the exposed region.

Spong, in U.S. Pat. No. 4,097,895, entitled MULTILAYER OPTICAL RECORD and which is incorporated herein by reference, discloses a bilayer optical recording medium which comprises a light reflective layer coated with a light absorptive layer. The coating parameters for the light absorptive layer are chosen to establish a condition for reducing reflectivity for the coated record blank at the recording light frequency. Bell, in U.S. Pat. No. 4,216,501, entitled OPTICAL ANTI-REFLECTIVE INFORMATION RECORD and which is incorporated herein by reference, discloses a trilayer optical recording medium having a transparent spacer layer interposed between the reflective and absorptive layers of the bilayer recording medium. The spacer layer serves to provide an even more efficient structure for optical recording.

The optical recording media described above, however, do have the disadvantage that they are expensive. The glass or other substrate on which the reflective, spacer, and absorptive layers are deposited must have a high degree of surface perfection, since defects on a micron and even sub-micron scale cause signal dropouts or disturbances to the retrieved signal.

Corrections to some extent can be made for macroscopic defects in disc substrates. Dropout signal compensator methods can be utilized, but only when the magnitude of the perturbation goes beyond the normal range of video signal levels which correspond to picture information. These schemes are typically of less consequence in data storage applications. Disc runout, or deviation from flatness, can also be compensated for by means of focus servos to keep the objective lens in focus at a fixed distance from the recording surface. The sensitivity limitations of these servos hamper the effectiveness of this compensation method when dealing with sharp deviations from flatness.

Microscopic imperfections in the substrate heretofore were eliminated by careful mechanical polishing of a glass disc substrate surface. While polishing the glass proved to be a successful method of attaining the high surface quality desired, the glass disc substrate becomes less desirable when investigating a cost-effective program for practical mass production of high quality substrates. Polishing steps are costly. Further, glass is a very brittle material subject to breakage, particularly when spinning at high speeds, typically 1800 rpm, during recording and readout. Not only is the disc destroyed and time, materials, and recorded information lost, but some danger to the operator is apparent.

Polyvinylchloride (PVC) and polymethylmethacrylate (PMMA) can also be used as substrates for optical recording media and information records; they are safer than glass substrates and yet they are rigid enough to support the overlying structures. However, PVC and PMMA, even after the most careful preparations, do not have a surface suitable for high quality optical recording. Thus, these substrates are coated with a liquid nonconformal coating layer such as acrylic latex floor finishes, commercial lacquers and varnishes and the like, to help fill in surface defects and yield a smoother surface.

Applying this coating in a sufficient thickness to produce a high quality surface has been a problem, however. For example, an acrylic latex floor finish at a thickness of 2 to 3 microns results in a glossy, hard surface. Yet coating thicknesses of 5 to 10 microns and above are needed on most PVC substrates to produce a surface smooth enough for high quality optical recording. Applying acrylic solutions at thicknesses of this magnitude produces a foggy, undesirable, matte finish, due in part, at least, to an inability of this thicker material to cure properly. Multiple applications of thinner layers of acrylic latex yield similar problems. The deposition of subsequent layers that contain solvents attacks the preceding layers and less than optically smooth surfaces result.

Thus, an optically smooth substrate, free of macroscopic and microscopic imperfections and suitable for high quality optical recording and information storage has been sought.

SUMMARY OF THE INVENTION

We have found that plastic substrates useful for optical recording can be made free of macroscopic and microscopic imperfections by coating them with a material that is able to flow so as to fill in surface defects in the base material and that can cure or dry rapidly at low temperatures. Two or more of these nonconformal layers can be applied to a desired thickness if a solvent barrier layer is applied intermediate to the nonconformal layers. The barrier layer enables stacking of the nonconformal layers until a thickness is reached sufficient to yield an optically smooth finish onto which the absorptive layer of an optical recording medium can be deposited.

DETAILED DESCRIPTION OF A PREFERRED EMBODIMENT

Figure 1:
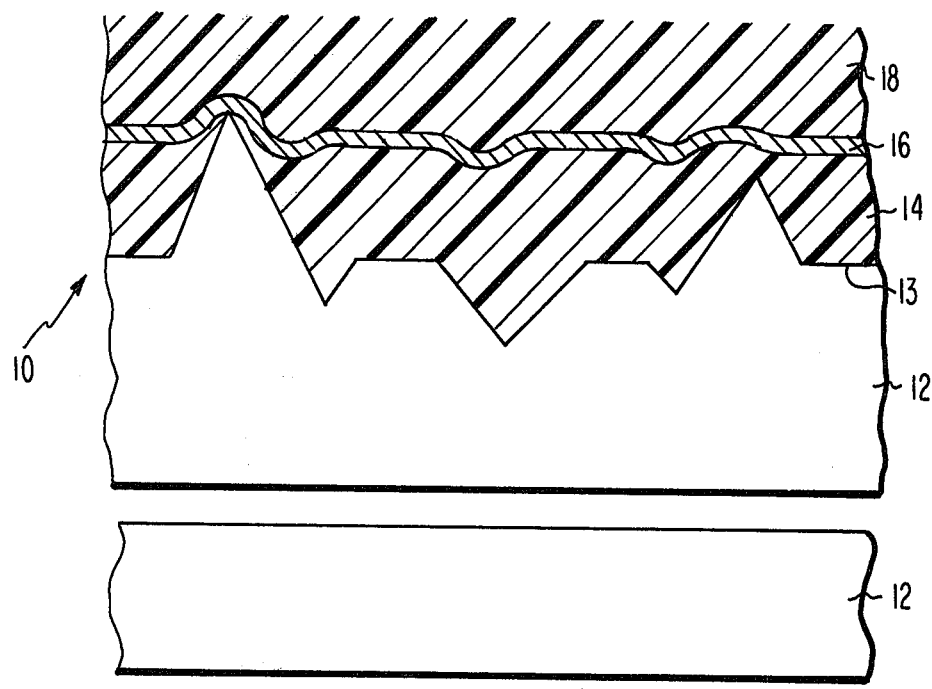
FIG. 1 is a fragmentary, enlarged cross-sectional view of an improved substrate of the invention.

The present invention will be described with reference to the drawing. FIG. 1 is a fragmentary, enlarged cross-sectional view of an improved substrate 10. The substrate 10 comprises a base layer 12 having a surface 13 in which are surface deformations. A nonconformal coating layer 14 about 2 microns thick overlies the surface 13 of the base layer 12, a solvent barrier layer 16 about 1000 angstroms thick overlies the nonconformal coating layer 14, and a second nonconformal coating layer 18 overlies the solvent barrier layer 16. These alternating layers can be stacked as thick as is necessary to smooth out deformations to a point where an acceptable surface results.

The base layer 12 can be of any inexpensive plastic such as polyvinylchloride, polymethylmethacrylate, and the like. The plastic base layer 12 is typically in the form of a disc. Thus, PVC record blanks similar to those commonly employed in the audio record industry become an obvious and convenient selection for the base layers. However, even carefully prepared, high quality discs of the above plastics do not have surfaces with adequate smoothness and perfection required for optical record and readout applications.

The nonconformal coating layers 14 and 18 are composed of materials that will flow readily and cure to a hard glossy surface free of surface imperfections. Such coating materials may be selected from the group consisting of acrylic latex floor finishes, non-pigmented epoxy paints, commercial varnishes and lacquers, and the like. These materials include a polymer emulsion and the like in a solvent. The first coating layer 14 can be applied to the base layer 12 in any convenient manner, such as by spinning. While the coating should be as thick as possible to fill in surface defects, a smooth, glossy surface should not be sacrificed. For example, when acrylic latex floor finish is employed, a thickness in excess of about 4 microns can yield a foggy, matte morphology which is probably attributable to an inability of the latex at this thickness to cure properly. By limiting the applied thickness of the acrylic latex to the 2 to 3 micron range, but at least 1 micron, a smooth, glossy finish results. Thicknesses on the order of 5 to 10 microns and above (of acrylic latex) are necessary to fill in surface imperfections in most PVC discs. Thus, several of these layers will be required to obtain the desired thickness.

Stacking nonconformal coating layers proves to be an ineffective way of improving substrate defects. As a subsequent coating layer is applied to and is curing upon an already cured coating layer, the solvent from the second layer attacks and causes defects in the morphology of the first layer by dissolving random areas and amounts of the first layer. With this second coating layer curing on a now partially redissolved first layer, new defects are propagated through the second layer and an unacceptable surface results. Thus a solvent barrier layer 16 is employed to allow successful stacking of the nonconformal coating layers 14 and 18.

Materials for the solvent barrier layer 16 should not be susceptible to attack and/or penetration by solvents, particularly those solvents employed in the coating composition. By applying this solvent barrier layer to the dried and/or cured first nonconformal coating layer 14, the subsequent coating layer 18 can be applied and dried or cured without danger of those solvents attacking the first coating layer 14. Materials suitable for use as a solvent barrier layer can include inorganic materials such as oxides of silicon or aluminum or metals, for example, aluminum, which can be applied by vacuum evaporation deposition about 1000 angstroms thick.

Figure 2:
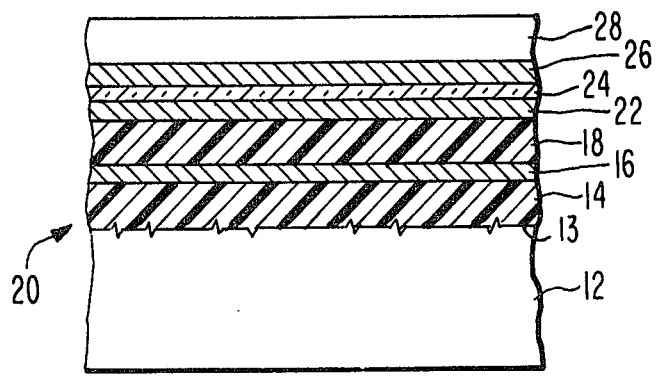
FIG. 2 is a cross-sectional view of an optical recording medium overlying an improved substrate of the invention.

An optical recording medium 20 having an improved substrate incorporated therein is shown in FIG. 2 which comprises the improved substrate 10 described above, a light reflective layer 22 overlying the improved substrate, a spacer layer 24 overlying the reflective layer 22, a light absorptive layer 26 overlying the spacer layer 22, and an overcoat layer 28 overlying the absorptive layer 26.

The light reflective layer 22 reflects a substantial fraction, preferably at least 50 percent, of the incident light at the wavelengths of the recording and readout light beams and can be a metal such as aluminum or gold or a single or multilayer dielectric reflector.

The spacer layer 24 is substantially transparent at the wavelength of the recording and readout light beams and can be of an inorganic material such as an oxide of silicon, aluminum, or titanium.

The light absorptive layer 26, which should be absorptive at the wavelength of a recording light beam, may be of a material such as titanium, rhodium, tellurium, selenium, alloys containing tellurium or selenium, or other chalcogenide alloys. The thickness of the light absorptive layer 26 is chosen so as to provide a balance between the reflectivity and absorption of this layer at the wavelength of a recording light beam.

The thicknesses of the spacer layer 24 and the light absorptive layer 26 are so related to the optical constants of the reflective layer 22, the spacer layer 24, and the absorptive layer 26 that the reflectivity of the recording medium is reduced and preferably minimized at the wavelength of the recording light beam. The spacer layer 24 is typically between about 100 angstroms and about 1500 angstroms thick and the absorptive layer 26 is typically between about 30 angstroms and about 400 angstroms thick.

The overcoat layer 28 is designed to protect the recording medium from the effects of surface dust and other contaminants and can be a layer of transparent room temperature vulcanizable silicone resin, for example General Electric's RTV 615 and RTV 602 and Dow Corning's Sylgard 184.

Figure 3:
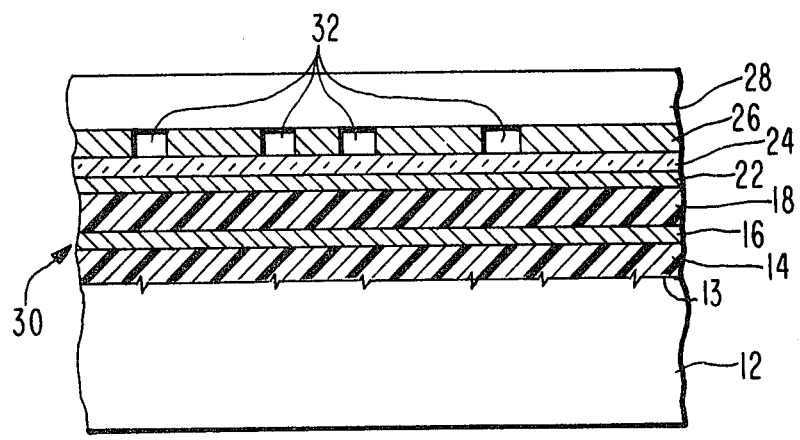
FIG. 3 is a cross-sectional view of an information record overlying an improved substrate of the invention.

Information is recorded in these media by exposure to a modulated recording light beam which can form a pit or a reversible change in the optical properties of the absorptive layers, for example, a change in the degree of crystallinity of the absorptive layer. FIG. 3 is a cross-sectional view of an information record 30 with the improved substrate incorporated therein. This information record 30 comprises the optical recording medium described in FIG. 2 having information recorded in the absorptive layer 26 comprising a series of pits 32 which are areas where the absorptive material has been substantially removed by ablation or melting by a recording light beam and whereby the variations in spacing between successive pit edges is representative of the information recorded.

Although the description of this invention has primarily been directed to its application in a trilayer optical recording medium, it should be noted that monolayer and bilayer media such as those described above would also benefit from this improved substrate.

This invention will be further illustrated by the following Example but the invention is not to be limited to the details described therein.

EXAMPLE 1

A 12 inch (30.5 cm) PVC disc was cleaned in a detergent solution in an ultrasonic cleaner and put on a spinner at 125 rpm. While spinning, the disc was rinsed with water and then with alcohol and spun dry. When dry, the disc was spin coated with a layer of acrylic latex floor finish. Just enough liquid was applied to cover the surface of the disc. After spinning, the layer thickness was about 2–3 microns. Care was taken to keep this disc surface dust free before and after the coating step. The layer was cured by baking at 35°–40° C. for about 24 hours.

An aluminum layer about 1000 angstroms thick was deposited by vacuum evaporation onto the above substrate.

A second layer of acrylic latex was applied to the aluminum layer by spinning as above. A second 1000 angstrom thick aluminum layer was evaporated onto the second acrylic latex layer. This aluminum layer was coated in sequence with $SiO_2$ about 650 angstroms thick and tellurium about 80 angstroms thick.

A recording was made on this medium and two control media. Control 1 was made with a single acrylic latex coating layer over the PVC disc and Control 2 was made with no acrylic latex coating layers over the PVC disc. The recording characteristics are summarized in Table 1 where SNR is the signal to noise ratio and BER is the bit error rate. Acceptable limits for high density information optical recording are SNR of 40 dB and above and BER of $10^{-5}$ or better.

TABLE I

| Disc | # of Acrylic Latex Coating Layers | SNR | BER |
| --- | --- | --- | --- |
| Control 2 | 0 | 37 dB | $10^{-3}$ |
| Control 1 | 1 | 45 dB | $10^{-3}$ |
| Example 1 | 2 | 45 dB | $5 \times 10^{-5}$ |

Control 2 had unacceptable recording characteristics. Although one coating layer in Control 1 improved the signal to noise ratio appreciably, the bit error rate was still unacceptable. Example 1 showed substantial improvements in both categories which resulted in an acceptable information record on a PVC base.

I claim:

1. A substrate suitable for optical recording comprising:
   a base layer,
   alternating layers overlying the base layer comprising two or more nonconformal coating layers overlying the base layer; and
   a solvent barrier layer interposed between the nonconformal coating layers.

2. A substrate as in claim 1 wherein the base layer is a polyvinylchloride disk.

3. A substrate as in claim 2 wherein the nonconformal coating layers are of acrylic latex.

4. A substrate as in claim 3 wherein the solvent barrier layer is aluminum.

5. In an optical recording medium comprising a substrate and a light absorptive layer thereon, which light absorptive layer absorbs light at the wavelength of a recording light beam, the improvement wherein the substrate comprises:
   a base layer,
   alternating layers overlying the base layer comprising two or more nonconformal coating layers overlying the base layer; and
   a solvent barrier layer interposed between the nonconformal coating layers.

6. An optical recording medium as in claim 5 with a light reflective layer interposed between the substrate and the light absorptive layer, which light reflective layer reflects light at the wavelength of recording light beam.

7. An optical recording medium as in claim 6 with a spacer layer interposed between the light reflective layer and the light absorptive layer.

8. An optical recording medium as in claims 5, 6 or 7 wherein the absorptive layer is composed of a material selected from the group consisting of titanium, rhodium, tellurium, selenium, alloys containing tellurium or selenium, and chalcogenide alloys.

9. An optical recording medium as in claim 5 wherein an overcoat layer overlies the absorptive layer.

10. In an information record comprising a substrate; a light absorptive layer thereon, which absorbs light at the wavelength of a recording light beam and which has an information track therein, the improvement wherein the substrate comprises:
    a base layer, alternating layers overlying the base layer comprising two or more nonconformal coating layers overlying the base layer; and
    a solvent barrier layer interposed between the nonconformal coating layers.

* * * * *